(No Model.)
F. SHLAUDEMAN.
CONNECTOR FOR ELECTRIC WIRES.
No. 448,680. Patented Mar. 24, 1891.
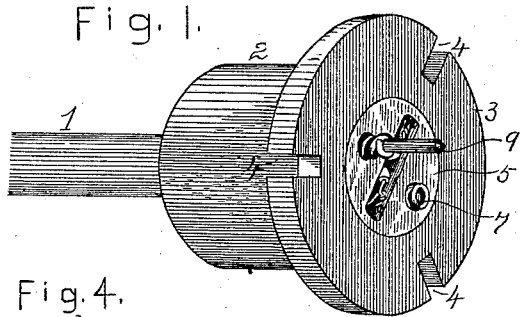
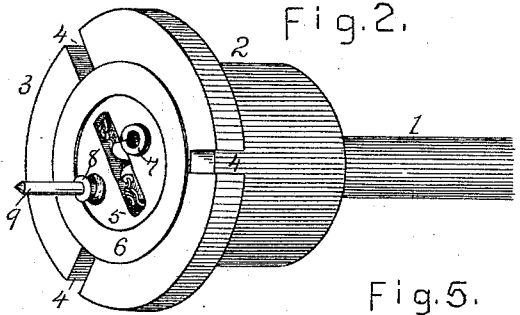
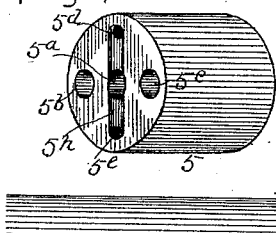
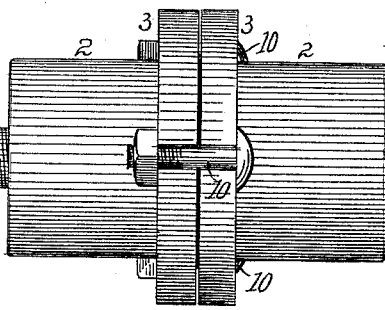
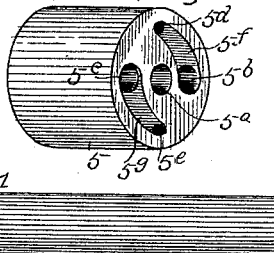
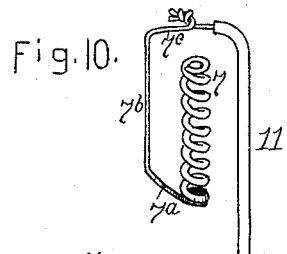
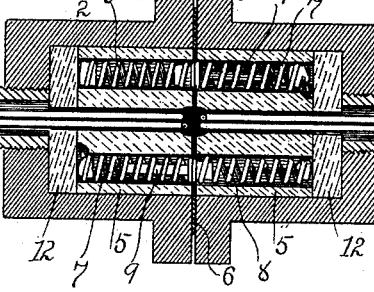
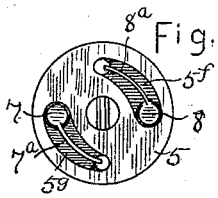
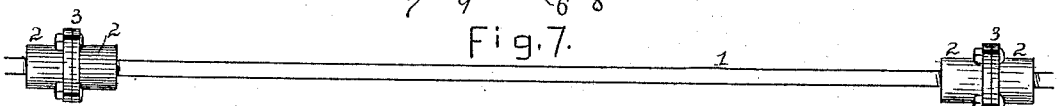
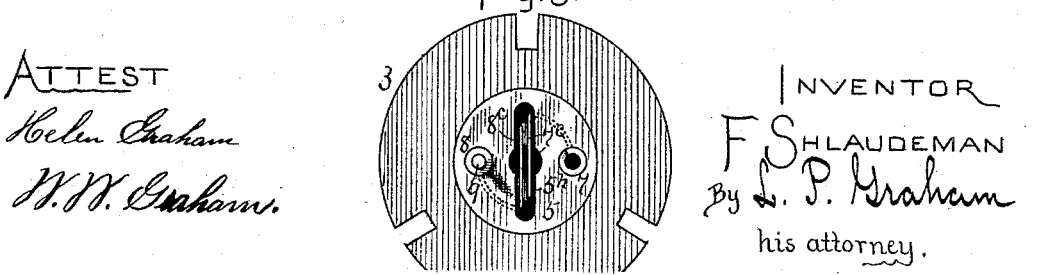
ATTEST
Helen Graham
W. W. Graham.
INVENTOR
F Shlaudeman
By L. P. Graham
his attorney.

UNITED STATES PATENT OFFICE.

FRANK SHLAUDEMAN, OF DECATUR, ILLINOIS.

CONNECTOR FOR ELECTRIC WIRES.

SPECIFICATION forming part of Letters Patent No. 448,680, dated March 24, 1891.

Application filed November 3, 1890. Serial No. 370,163. (No model.)

*To all whom it may concern:*

Be it known that I, FRANK SHLAUDEMAN, of Decatur, in the county of Macon and State of Illinois, have invented certain new and useful Improvements in Jointed Water-Proof Electric Circuits, of which the following is a specification.

This invention consists, broadly, in a joint of circuit composed of a water-proof pipe or casing and circuit-wires in the pipe with their terminals presented at both ends of the pipe in such manner that the mechanical coupling of the joint to a similar joint will automatically connect the circuit-wires of one joint with the circuit-wires of the other joint. It also consists in a circuit formed of such joints.

The invention consists, specifically, in a joint of circuit composed of a water-proof pipe or casing and circuit-wires in the casing projected yieldingly beyond the ends thereof, so that when the ends of two such joints are coupled together the circuit-wire terminals will be forced in close contact, those of one pipe with those of the other.

The invention further consists in the details of construction and combinations of parts hereinafter set forth and claimed.

In the drawings accompanying and forming a part of this specification, Figure 1 is a perspective representation of an end of a joint constructed in accordance with my invention. Fig. 2 is a similar view of another joint, the respective positions of the two indicating the manner of their connection. Fig. 3 represents the two joints coupled together. Fig. 4 is a perspective view of an insulating guide-block used in each end of each joint; and Fig. 5 is a similar view of the same block, showing the opposite end thereof. Fig. 6 is a central longitudinal section through a coupling, showing the contact of the circuit-wire terminals and details of internal construction. Fig. 7 shows a part of a continuous circuit formed of the detachable joints. Fig. 8 is a face view of a joint-coupling, showing a certain stage in the completion of the same. Fig. 9 is a plan of the inner end of the insulating guide-block. Fig. 10 indicates generally the direction of the wire in the guide-block.

The pipe 1 is impervious to water and its connection with socket 2 is water-tight. The flange 3 of socket 2 has slots 4 to admit the coupling-bolts 10. The insulating guide-block 5 has the central hole $5^a$ and the eccentric holes $5^b$, $5^c$, $5^d$, and $5^e$, all extending lengthwise entirely through. It also has at one end a diametrical groove $5^h$ and at the other end the two oblique grooves $5^f$ and $5^g$. The coiled terminal 7 extends through, say, hole $5^e$, the part $7^a$ lies in groove $5^g$, the part $7^b$ extends through hole $5^c$, and the part $7^c$ extends along groove $5^h$ to its junction with main circuit-wire 11. Terminal 8 is identical in construction and arrangement with terminal 7, except that it has a guide-pin 9 adapted to fit in coil 7. It occupies different holes in the insulated block, and it connects with main circuit-wire $11^a$. The washers 12 insulate the wires in the block from contact with the bottoms of the sockets, and they have central holes to admit the circuit-wires 11 and $11^a$.

In construction the pipes of suitable length are each provided on each end with a socket 2. Blocks 5 are fitted with terminals 7 and 8, the connecting ends of which are preferably bent down into grooves $5^h$, as seen in Figs. 8 and 9. The washers 12 and blocks 5 are placed in position in the sockets, the latter fitting loosely, and the insulated circuit-wires 11 and $11^a$ are run through the pipes and sockets and connected with the terminals, as shown. When the joints are connected together, a rubber gasket 6 is interposed between the flanges, each pin 9 is inserted in a coil 7, and the parts are drawn together and tightly secured by the coupling-bolts 10, the elasticity of the coils meanwhile exerting sufficient force to insure thorough contact of the terminals. The yieldingly-protruding terminals insure effective contact. The guide-pins aid in this and in joining the parts accurately together. The shown construction of guide-block permits the desired arrangement of the terminals and enables the circuit-wires to be joined thereto without difficulty.

The circuit, as a whole, is completely water-proof, and is well adapted for use in breweries, tanneries, and other places where moisture is prevalent.

I claim—

1. A coupling for a jointed water-proof electric circuit, consisting in the combination of socket 2, insulating-washer 12 at the bottom of the socket, insulating guide-block 5, adapted to the socket, and circuit-wires extending circuitously through holes in the guide-block and terminating in protruding spiral coils, as set forth.

2. In couplings for jointed water-proof circuits, the combination of a water-proof socket, an elastic spiral terminal projecting normally beyond the face of the socket and bearing against an insulator, an opposing socket, and an elastic terminal therein bearing against an insulator, projecting normally beyond the face of the socket, and having a guide-pin adapted to the hollow of the opposing spiral, as set forth.

3. The combination, with a water-proof socket, of an insulating guide-block, a spiral coil extending from front to back through a hole in the guide-block, a wire extending from the rear end of the coil through a separate hole in the guide-block to the face of such block, and a main circuit-wire extending through still another hole in the guide-block and connecting with the wire of the spiral on the face or outer end of the block, as set forth.

In testimony whereof I sign my name in the presence of two subscribing witnesses.

FRANK SHLAUDEMAN.

Attest:
I. D. WALKER,
WILLIAM GRAHAM.